Dec. 10, 1946.    G. D. ANDERSEN ET AL    2,412,194
PERSPECTIVE DRAWING DEVICE
Filed Sept. 22, 1943    2 Sheets-Sheet 1

James L. Hansen
George D. Andersen
Chester L. Spencer
INVENTORS

BY Edwin Coates
ATTORNEY

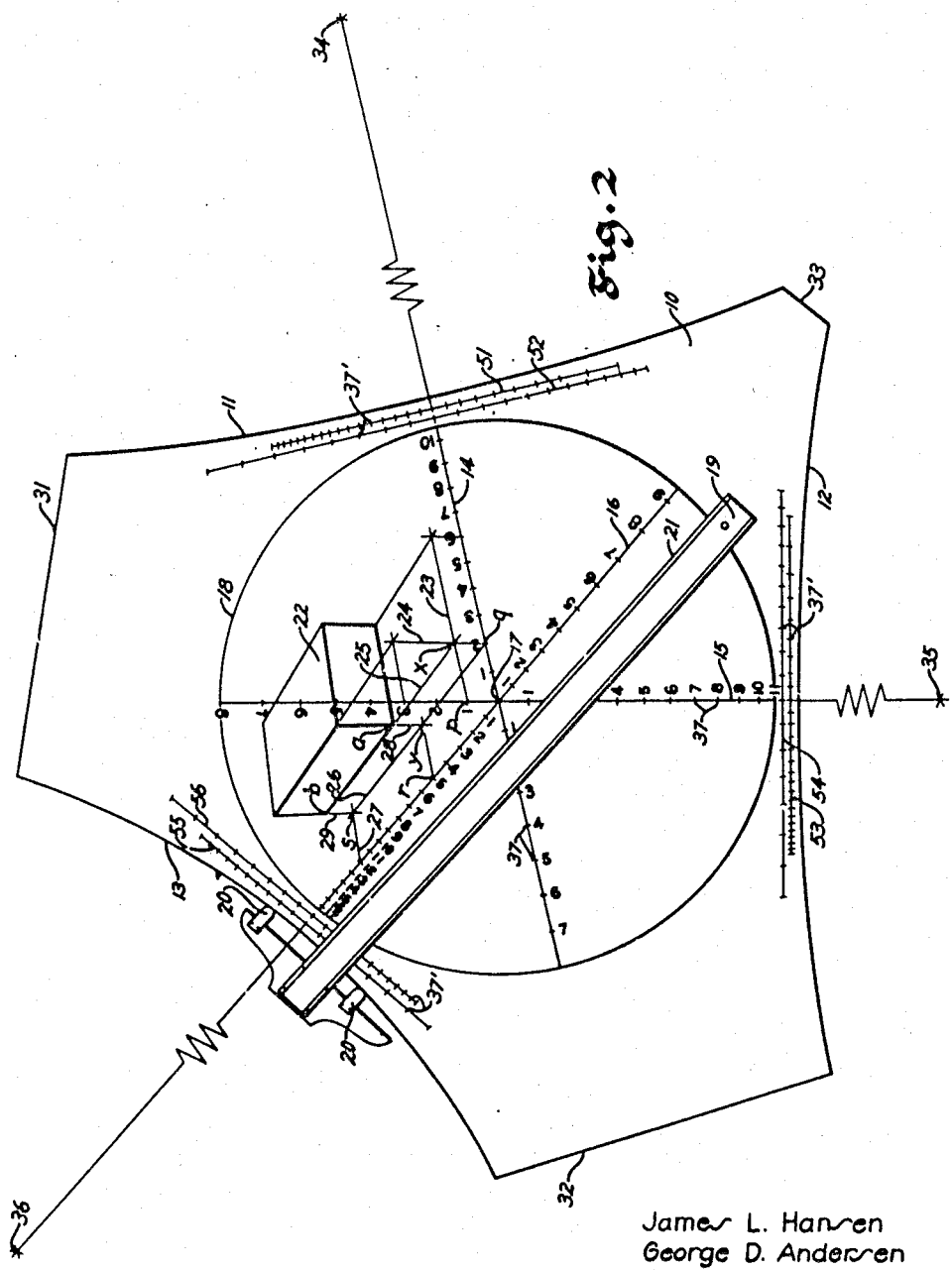

Patented Dec. 10, 1946

2,412,194

UNITED STATES PATENT OFFICE 2,412,194

PERSPECTIVE DRAWING DEVICE

George D. Andersen, Los Angeles, Chester L. Spencer, Santa Monica, and James L. Hansen, Los Angeles, Calif.; said Spencer and said Hansen assignors to said Andersen Application September 22, 1943, Serial No. 503,582

8 Claims. (Cl. 33—77)

1

This invention relates to a perspective drawing device.

The invention has as one object the provision of a simplified device for making perspective drawings, which device may be operated by relatively inexperienced draftmen using simple procedural rules.

Another object of the invention is to provide a perspective drawing device by which three points (oblique) perspective drawings may be made at six angles of view by the simple expedient of orientating the drawing board of the device at six angular positions with reference to the draftsman and at six additional angles of view by turning over the board and similarly orientating it.

Another object of the invention is the provision of a perspective drawing device by which a perspective drawing may be made without the use of a multi-lined perspective chart. The measurements of the object to be drawn and its distance from and orientation relative to the intersection point of three perpendicularly related perspective planes are the only data necessary, eliminating the need of projecting points from orthographic views of the object to the perspective drawing sheet.

Another object of the invention is the provision of a device by which the linear measurements and orthographic views of an object may be made from a perspective view thereof.

In the drawings which are for illustrative purposes only,

Figure 2 is a top plan view of the drawing board of the device.

The expression "three point," "oblique" and "triconjugate" are used synonymously herein to describe a type of perspective drawing in which there are three vanishing points, of which, preferably, one is for a group of lines of an object perpendicular to the visual horizon of the two eyes of the observer, and the other two for two groups of perpendicularly related lines of an object respectively, which are parallel to that horizon, these latter groups of lines being both usually disposed at complementary acute angles to the picture plane for a more effective presentation of the object. The object must be entirely below or above the horizon line, for otherwise, two vanishing points will be required for the vertical lines resulting in a distorted picture.

Figure 3:
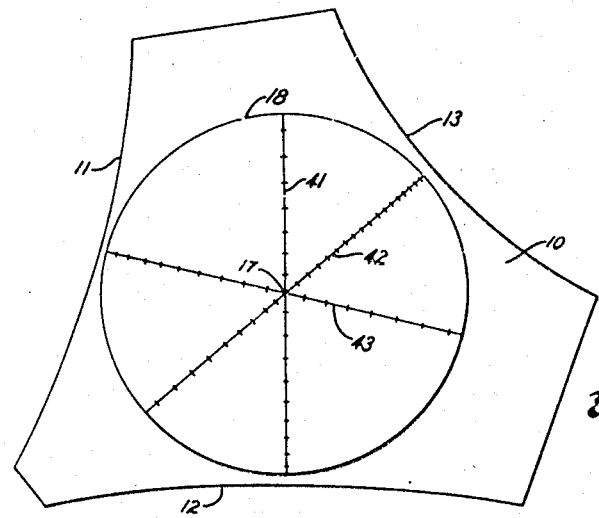
Figure 3 is a bottom plan view of the drawing board of the device.

A drawing board 10, preferably of wood, is shown in Figures 2 and 3. The edge face of the board is perpendicular to the plane or side of the board and comprises six sections, three of which are circularly arcuate faces 11, 12, and 13,

2 and three of which are rectilinear faces 31, 32 and 33, the arcuate and rectilinear faces alternating around the board. The arcuate faces 11, 12 and 13 are concave, and center at points 34, 35 and 36 off the board which are the three vanishing points of the perspective drawings which the board is used to make. These points are shown on Figure 2 as inwardly from their actual positions for convenience of illustration.

Marked directly on the board or on a sheet of paper or other suitable material secured to the board are three lines 14, 15 and 16 which intersect at 17, a point generally central of the board. Each of these lines which may be termed "measurement" lines, is perpendicular to the corresponding one of the arcuate faces 11, 12 and 13, and would pass through the corresponding vanishing point if extended. It is, therefore, a radial line of its associated arcuate face and since these radial lines are the most significant radial lines of the arcuate faces, they may also be termed "primary" radial lines.

Each radial line is provided with markings 37 which are spaced along the lines at progressively greater intervals, the shorter intervals being adjacent the arcuate face to which the line is perpendicular. The scale of these spacings is in accordance with the principles of perspective, these principles being well known and used in the making of perspective drawings and in the manufacture of perspective drawing indicator sheets and other aids to making perspective drawings. The linear intervals between the markings represent some linear unit, as for example, a foot, an inch, a centimeter or a fraction of one of these units; and the markings are provided with appropriate designating ordinals. Preferably these ordinals begin at 0 at point 17 and increase numerically in each direction along each of the three lines 14, 15 and 16.

The three measurement lines are the intersections of the three imaginary perspective planes of the board which are reference planes with respect to which the object is located and measurements of the drawing of the object are determined. These three perspective planes intersect at point 17 which is the center of the visual cone through which the picture plane passes perpendicularly to the visual line from the eye of the observer.

The drawing is preferably made within a circle 18 centered on point 17. This circle outlines the visual cone beyond which at the angle of view of the board the drawn representation of an object presents objectionable distortion; accordingly the markings 37 preferably do not extend beyond this circle.

With the board is used a T square 19, the head of which is provided with guide lugs or rollers 20 and a working straight edge 21 which is normal to and bisects the line connecting the inwardly facing, board-contacting surfaces of the guide lugs 20. The guide lugs 20 are for contact with the arcuate faces 11, 12 and 13, the straight edge 21 being thus always held coincident with some radial line of the arcuate face contacted by the guide lugs 20.

To use the board to draw for example a perspective view of an object 22 (Figure 2) having six rectangular faces at right angles to each other seven inches long, four inches wide and two inches thick, placed or assumed to be placed with its faces lying, two in right vertical planes, two in left vertical planes and two in horizontal planes, these planes being parallel to the three perspective planes of the board, a piece of transparent tracing cloth or paper is fastened to the board and a corner of the object is located and represented on the paper by a point $a$ according to the assumed position of this corner with respect to point 17 which is the center of the visual cone for the drawing. Assuming this corner of the object is two inches back of the left vertical perspective plane of the board, five inches back of the right vertical perspective plane and one inch above the horizontal perspective plane, the point $a$ on the drawing is located as follows:

Place the T square guides against arc 11, draw a line 23 through a point $p$ on line 15 scaled one inch from 17. Place the T square on arc 12, draw a line 24 through a point $q$ on line 14 scaled two inches from 17 intersecting line 23 at $x$. Then with the T square on arc 13 draw a line 25 through $x$ and a line 26 through point $q$; then with the T square on arc 11, draw a line through a point $r$ scaled five inches from 17 intersecting 26 at $y$. With the T square on arc 12 draw a line 28 through $y$ intersecting 25 at $a$.

Now to draw the line representing the edge $a$—$b$ of the object 22, place the T square on arc 11 and draw a line 27 through a point scaled seven inches from $r$ on line 16, intersecting line 26 at $s$. With the T square on 12 draw a line 29 through $s$ intersecting line 25 at $b$. Similarly all the edges of object 22 may be drawn.

Each point of an object is represented on the drawing by a point which is the intersection of three lines, each of which is drawn with the T square placed on a first arcuate face through a point which is the intersection of two lines drawn with the T square on the second and third arcuate faces through points on the third and second measurement lines respectively, these points on the measurement lines being spaced linear intervals from the visual cone center point on the drawing, which are indicated distances equal to the corresponding actual distances of the point on the object from the three planes corresponding to the three perspective planes of the board. It is, of course, only necessary to locate two of these intersecting lines to determine the point.

Figure 1:
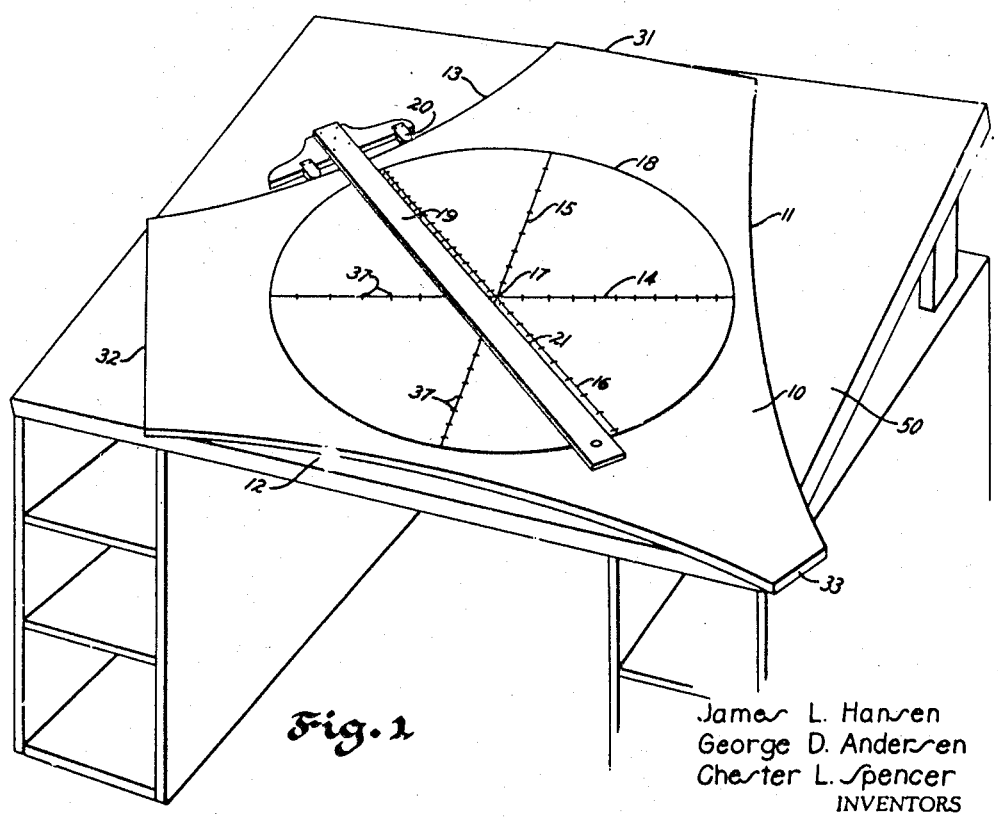
Figure 1 is a perspective view of a perspective drawing device of this invention.

As shown in Figure 3, the under side of the board may be provided with measurement lines, 41, 42 and 43 and other markings vertically registering through the plane of the board with the measurement lines and markings already described as appearing on the upper side of the board. Since the board can be placed on a drawing table 50 (Figure 1) with any one of the arcuate or rectilinear faces directly in front of the draftsman, it is obvious that by shifting the board rotatively to any one of these six positions with either one of its working sides uppermost twelve angles of view are made available for perspective drawings. By proper selection of the relative curvatures of the arcuate faces and of the relative position of the arcuate and alternating rectilinear faces, enough angles of view are made available to satisfy all ordinary practical requirements in making perspective drawings.

Two measurement lines 51 and 52 (Figure 2) may be marked on the drawing board adjacent the arcuate face 11. Similar measurement lines 53, 54, 55 and 56 may also be marked on the drawing board for the arcuate faces 12, and 13. The scaled markings 37' on lines 51 and 52 are located by projecting along radii of arcuate face 11 the markings on the radial measurement lines 15 and 16 respectively. The markings 37' on lines 53, 54, 55 and 56 are similarly located.

If these lines 51 to 56 are provided, instead of using a point on a radial measurement line, there may be used the corresponding point on the corresponding one of the measurement lines 51 to 56 which is adjacent the arcuate face against which the head of the T square is placed. The entire central part may be thus concealed without interfering with the use of the board. Opaque drawing paper may therefore be substituted for the transparent paper which must be used in making a perspective drawing with a board which is not provided with these measurement lines 51 to 56.

An object can be designed in perspective on the board and orthographic views made therefrom. The linear intervals between determining points on the object can be scaled from the perspective view on the drawing board by reversing the procedure above outlined for making a perspective drawing and the linear distances thus obtained can be used in making the orthographic views on another drawing board with the drawing instruments conventionally used for this purpose.

The principles of this invention may be embodied in a perspective drawing board for making two point perspective drawings. In such a board, that one of the faces 11, 12 and 13 directly in front of the draftsman will be a straight line and the associated measurement line will be perpendicular thereto. The measurement points on this line will be spaced at equal linear intervals, each interval representing to scale a vertically disposed actual unit distance.

The arcuate faces may be convex, centering on vanishing points off the board, the radial lines of a face crossing the board between the arcuate face and the vanishing point.

While the invention has been disclosed by describing an embodiment thereof, the invention is not limited to this or any other single embodiment. The invention resides in certain principles of construction of a perspective drawing board which are set forth and defined in the following claims.

We claim:

1. In a perspective drawing device, the combination of: a board having top and bottom sides and three straight-edge-guiding faces intersecting the plane of the sides of the board, each face being circularly arcuate on a center in the plane of the sides of the board and beyond the surface thereof, the faces being so positionally related that three primary radial lines of the faces passing through the central portions thereof intersect at a common point substantially centrally of the board; and rows of linear measurement point indicia fixedly associated with one side of the board, the rows being scaled and located so that a radial line of any one face drawn through any one of the point indicia of a first one of two rows correlated with said any one face is the locus of all the points spaced from the primary line of said any one face along the radial lines of a first one of the other two waces at linear intervals representing in accordance with the principles of perspective a distance which is indicated by said any one of the point indicia of said first one of said two correlated rows, and a radial line of said any one face drawn through any one of said point indicia of the second of said two correlated rows is a similar locus with respect to the second one of the other two faces.

2. In a perspective drawing device, the combination of: a board having top and bottom sides and three straight-edge-guiding faces intersecting the plane of the sides of the board, each face being circularly arcuate on a center in the plane of the sides of the board and beyond the surface thereof, the faces being so positionally related that three primary radial lines of the faces passing through the central portions thereof intersect at a common point substantially central of the board; and rows of linear measurement point indicia fixedly associated with one side of the board, the rows being scaled and located so that a radial line of any one face, drawn through any one of said point indicia of a first one of two rows correlated with said any one face, intersects the primary line of a first one of the other two faces at a point spaced from the said common point by a linear interval representing in accordance with the principles of perspective the distance indicated by said any one of said point indicia of said first correlated row, and a radial line of said any one face, drawn through any one of said point indicia of the second one of said two correlated rows, intersects the primary line of the second one of the other two faces at a point spaced from the said common point by a linear interval representing in accordance with the principles of perspective the distance indicated by said any one of said point indicia of said second correlated row.

3. In a perspective drawing device, the combination of: a board having top and bottom sides and three straight-edge-guiding faces intersecting the plane of the sides of the board, at least two of said faces being circularly arcuate on a center in the plane of the board and beyond the surface thereof, the faces being so positionally related that three primary lines perpendicular to the faces and passing through the central portions thereof intersect at a common point substantially central of the board; rows of linear measurement point indicia fixedly associated with one side of the board, the rows being scaled and located so that a line perpendicular to any one face, drawn through any one of said point indicia of a first one of two rows correlated with said any one face, intersects the primary line of a first one of the other two faces at a point spaced from the said common point by a linear interval representing in accordance with the principles of perspective the distance indicated by said any one of said point indicia of said first correlated row, and a line perpendicular to said any one face, drawn through any one of said point indicia of the second one of said two correlated rows, intersects the primary line of the second one of the other two faces at a point spaced from the said common point by a linear interval representing in accordance with the principles of perspective the distance indicated by said any one of said point indicia of said second correlated row.

4. In a perspective drawing device, the combination of: a board having top and bottom sides marked with a depth line, a width line and a height line, all of said lines intersecting at a common point substantially central of the planes of the sides of the board, said board having edge faces intersecting the plane sides of the board and said faces being arcs of different radii, and each said line being a radial line passing through the central portion of each of said arcs and having a fixed relationship with one another, and correlated linear measurement indicia along each of said lines scaled in accordance with the principles of perspective.

5. In a perspective drawing device, the combination of: a board having top and bottom sides and three guiding faces intersecting the plane of the sides of the board, at least two of said faces being circularly arcuate on a center in the plane of the sides of the board and beyond the surface thereof, the faces being so related that primary lines perpendicular to the faces and passing through the central portions thereof intersect at a common point substantially central of the board, and rows of linear measurement indicia on the planes of the sides of the board and adjacent said arcuate faces, said rows being scaled in accordance with the principles of perspective.

6. In a drawing device of the character referred to, a planar board having on a side thereof a depth line, a width line and a height line, all of said lines intersecting at a common point substantially central of the board, said board having faces intersecting the plane side of the board and said faces being arcs, and each said line being a radial line passing through the central portions of each of said arcs and having a fixed relationship with one another, and correlated linear measurement indicia along each said line scaled in accordance with the principles of perspective.

7. In a perspective drawing device, a board having on a side thereof a depth line, a width line and a height line, all said lines intersecting at a common point substantially central of the board, said board having faces intersecting the plane of a side of the board and said faces being arcs of different radii having a fixed relationship with one another, each said line being a radial line passing through the central portion of each of said arcs, and correlated measurement indicia along each of said lines at progressively greater intervals, the shorter intervals of space between said indicia being adjacent said arcs.

8. In a perspective drawing device, the combination of: a planar board having on a side thereof a height line, a depth line and a width line, and guiding faces intersecting the plane side of the board having different radii and having a fixed relationship with one another, said faces being so related that said lines pass through the central portions of said guiding faces and intersect at a common point substantially central of the said side of the board, and rows of correlated measurement indicia along each of said lines scaled in accordance with the principles of perspective.

GEORGE D. ANDERSEN.
CHESTER L. SPENCER.
JAMES L. HANSEN.